Jan. 13, 1970  K. N. REGAR  3,489,126
ROTARY VOLUMETRIC MECHANISM USABLE AS PUMPS, COMPRESSORS, FLUID
MOTORS, INTERNAL COMBUSTION ENGINES, AND THE LIKE
Filed Aug. 1, 1967  2 Sheets-Sheet 1

INVENTOR
Karl Nicolaus Regar

BY Spencer & Kaye
ATTORNEYS

Jan. 13, 1970  K. N. REGAR  3,489,126
ROTARY VOLUMETRIC MECHANISM USABLE AS PUMPS, COMPRESSORS, FLUID
MOTORS, INTERNAL COMBUSTION ENGINES, AND THE LIKE
Filed Aug. 1, 1967  2 Sheets-Sheet 2

INVENTOR
Karl Nicolaus Regar

BY Spencer & Kaye
ATTORNEYS

United States Patent Office 3,489,126
Patented Jan. 13, 1970

3,489,126
ROTARY VOLUMETRIC MECHANISM USABLE AS PUMPS, COMPRESSORS, FLUID MOTORS, INTERNAL COMBUSTION ENGINES, AND THE LIKE
Karl Nicolaus Reger, Aleea Tineretului 1,
Resita, Rumania
Filed Aug. 1, 1967, Ser. No. 657,654
Claims priority, application Rumania, Aug. 1, 1966, 51,975
Int. Cl. F02b 53/00, 55/00
U.S. Cl. 123—16         6 Claims

ABSTRACT OF THE DISCLOSURE

A rotary volumetric mechanism for driving a fluid or for being driven by a fluid, including a stator having an annular channel formed therein with fluid inlet and outlet channels communicating therewith. The annular channel is variable in depth along the longitudinal dimension thereof, having at least one point of maximum depth and one point of minimum depth. A rotor is rotatably mounted adjacent to the stator in such close proximity as to substantially close the annular channel. A plurality of protruding elements are attached to the rotor and project therefrom into the annular channel, each of these protruding elements being shaped to fit relatively snugly within the annular channel and being spring loaded toward the annular channel. When the stator is rotated, the protruding elements move along the annular channel and force fluid therein from the inlet to the outlet channel thereof or, conversely, if an expanding fluid is introduced into the fluid inlet channel, the rotor will be rotated thereby.

---

This invention concerns a rotary volumetric mechanism for driving a fluid or for being driven by a fluid.

The mechanism of this invention is useful in a wide range of applications in the area of hydraulic and thermal engines, pumps and hydraulic motors, air and gas compressors, motors driven by energetic fluids (compressed air, gas, or steam) and rotary internal combustion engines. As used in this document, the term "volumetric mechanism" is defined as signifying a mechanism having an enclosed variable volume chamber, such as the piston-cylinder assembly of a motor or pump, and a "rotary" volumetric mechanism is one in which the volumetric variation is achieved by means of a rotary member.

Modern technology utilizes volumetric mechanisms in numerous applications such as pumping incompressible fluids, compressing compressible fluids, driving hydraulic and pneumatic drives and transmissions, and transforming the thermal energy of a thermodynamic medium or a chemical fuel into mechanical energy.

Although the crank and connecting rod assembly is the most frequently used kind of rotary drive for volumetric mechanisms, its well known limitations have in many cases necessitated the use of other volumetric mechanisms having higher performance. One of these mechanisms, the most important one, which has successfully replaced the classic crank and connecting rod assembly in the field of pumps and compressors, hydraulic and pneumatic motors, and in hydraulic and pneumatic drives and transmissions, is the rotary rotative volumetric mechanism with radial gliding blades.

This mechanism has been and still is of an undoubted value in modern technology, but its field of application is nevertheless restricted by a number of limitations.

The most important of these limitations are the following:

(a) The centrifugal forces press the rotor blades upon the stator surface with a force proportional to the rotary speed. For a speed greater than given, experimentally determined, limits, the specific pressure arising between the edge of the rotor blade and the inner surface of the stator may reach such values that the oil film between the respective surfaces is expelled, producing a halfdry or dry friction, which causes a rapid wearing of the blade and of the stator housing.

(b) The mechanism must be assembled with most precise adjustments, since an assembly with too tight a fit may cause the mechanism to freeze, while a loose fit causes reduced volumetric efficiencies, flow inversions, and a diminishing of fluid pressure and flow rate.

(c) At high speeds this mechanism is not satisfactory, since the gliding of the blades is a function of speed, which is hard to control at high speeds. For this reason, such mechanisms are usually coupled to constant speed electric motors.

(d) The flow pressure of pumped or compressed fluids is limited by the imperfect positioning of plane rectangular parts, such as the blades of the mechanism, and by the reduced mechanical stress imposed by the constructional factors of the rotor.

(e) The thermal strains which the mechanism may support are of a relatively low value, since it is impossible to cool the rotor and the blades while they are working, whereby steam-engines with high-parameter-steam which utilize this mechanism are limited to a very restricted field and the construction of internal combustion engines based on this mechanism is practically impossible.

SUMMARY OF THE INVENTION

The present invention, which attacks the problem from an essentially new view point, removes most of the above mentioned deficiencies.

The functional principle of this invention is based on the axial and alternate movement of blades in radial channels of a rotor, under the action of the permanent contact between the active part of the blades of corresponding annular channels having a continuously variable depth provided in the lateral caps of the stator.

The variation of the depth of these annular channels in the stator is determined by the intended use of the mechanism. If e.g. the mechanism is utilized as a pump, or as a compressor, or as a hydraulic or pneumatic or steam motor, the depth variation of the channels must pass through two diametrically opposed points representing a maximum respectively and a minimum. To achieve a full thermal cycle, necessary for the working of the mechanism as an internal combustion engine, the depth variation of the channels must include two maximum-points and two minimum-points, in alternate, diametrically opposed positions, with the lines between the maximum and minimum points being at right angles to each other. Thus, during one rotation, the volume enclosed by two adjacent blades, by the surface of the corresponding channel, and by the frontal surface of the rotor, varies continuously, permitting an open or cyclic evolution of an energetic fluid such as pressurized liquid; compressed air; steam; exhaust gases; or mixtures of air-liquid fuel for an internal combustion in the mechanism.

Geometrically the annular stator-channels are radially disposed around the shaft of the mechanism, and during rotation, the end of the rotor blade touches points of a continuous varying position (on the axis), in such a manner as to realize the prescribed variation low of the channel depth.

DESCRIPTION OF THE PREFERRED EMBODIMENTS

Figures 5, 6:
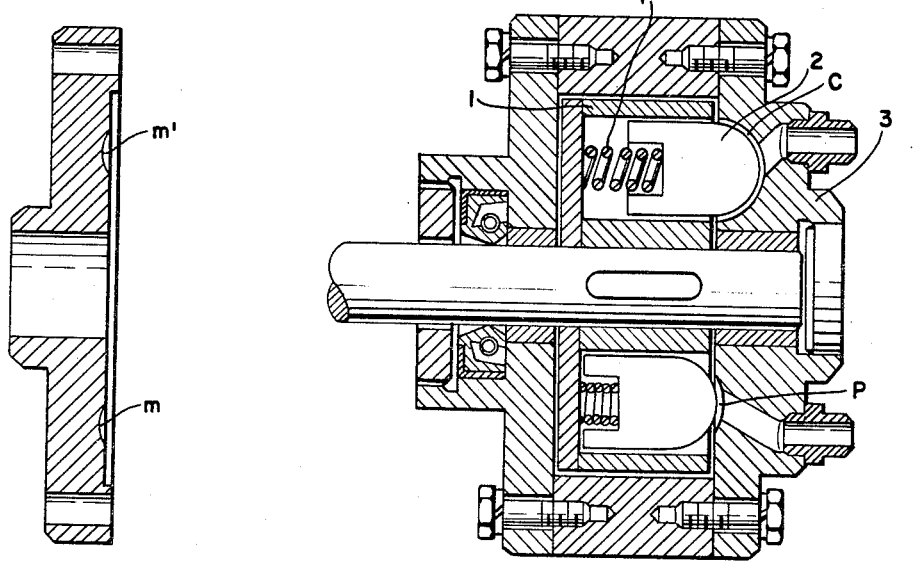
FIGURE 5 is a cross-sectional view taken substantially along the plane defined by the reference line 5—5 of FIGURE 3.
FIGURE 6 is an axial cross-sectional view of one complete embodiment of this invention.
Figure 7:
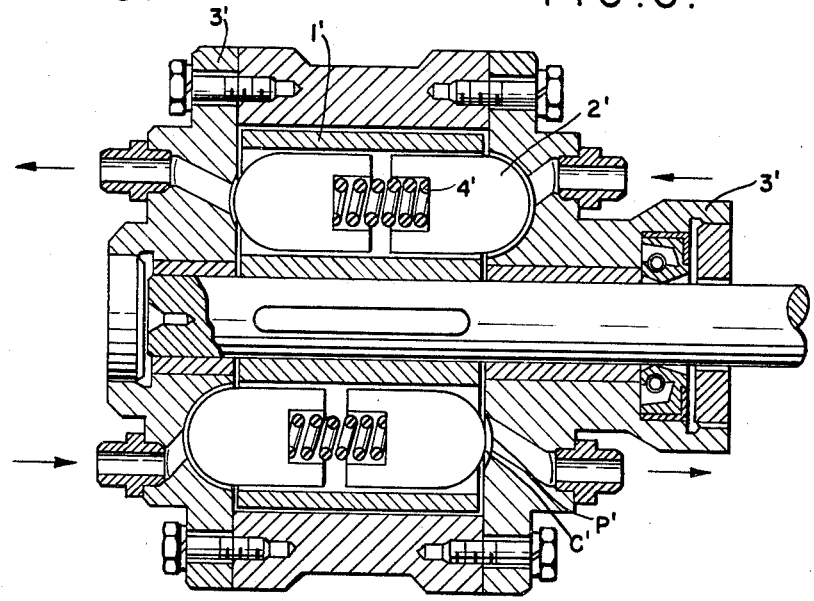
FIGURE 7 is an axial cross-sectional view of another complete embodiment of this invention.

Referring to FIGURE 6, one embodiment of the invention comprises a rotor 1, with channels, in which are moving groups of at least three blades, with radially disposed profiled peaks 2 and of a stator, with lateral caps 3, in which there are provided channels $c$, with the profile $p$, with a section corresponding to the profile of the blades peak, preferably a semiround section in the points of maximum depth and having the form of a circular segment in its other parts, while the minimum depth (which theoretically may be zero) determines also the minimum surface of the circular segment of the blades peak.

The lateral caps of the stator are also provided with slits for the admission and the exhaustion of the fluid.

The opposed blades, placed on the same generating line of the rotor, are maintained in permanent contact with the surface of the channels by the tension of the spring 4 mounted between the blades. In the simple acting variant FIGURE 6, the blades are placed on only one side of the mechanisms rotor, their axial movement being determined in one direction by the profile $p$ of the channel $c$, while in the other direction by the spring 4, utilizing the energy stored in the previous movement.

The such defined mechanism may be utilized in the simple or double acting variant as pump and hydraulic motor, as compressor, as pneumatic and steam motor, as internal combustion engine, with electric self ignition.

Figure 1:
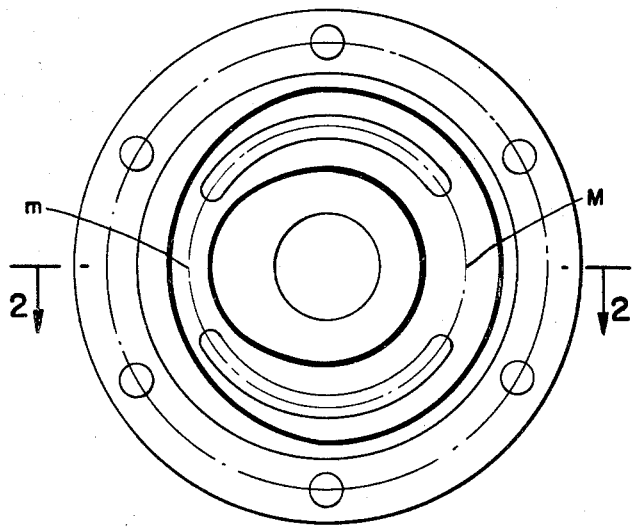
FIGURE 1 is a plan view of one illustrative stator member of this invention.
Figure 2:
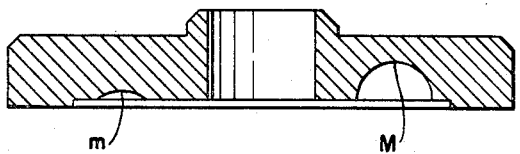
FIGURE 2 is a cross-sectional view taken substantially along the plane defined by the reference line 2—2 of FIGURE 1.

FIGURES 1 and 2 show that for two adjacent blades, symmetrically disposed on both sides of the point of minimum depth $m$ of the channel, the space enclosed by the blades is of minimum value, while for a similar symmetric disposition on both sides of the point M of maximum depth, the space enclosed is of a maximum value. The mechanisms having channels with only two characteristic points (one of a maximum depth, the other of a minimum depth) are destined for open evolution of fluids: admission and compression, in the case of pumps and compressors; expansion and exhaustion for motor, driven by compressed air, steam, gases.

Figure 3:
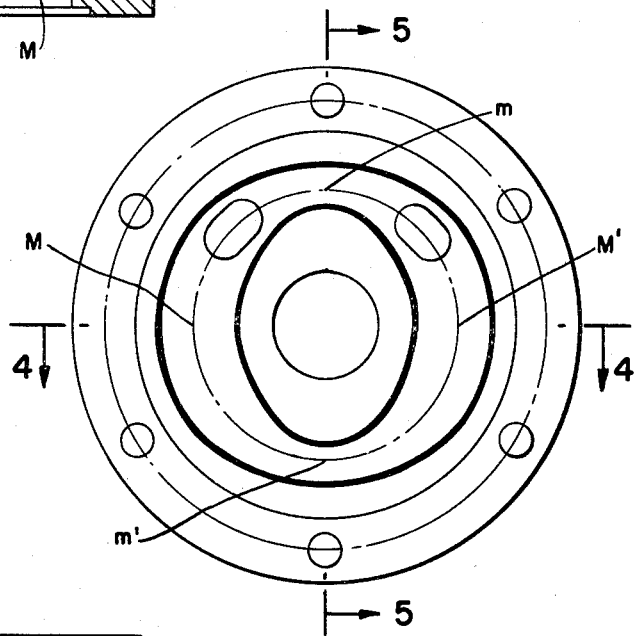
FIGURE 3 is a plan view of a second illustrative stator member of this invention.
Figure 4:
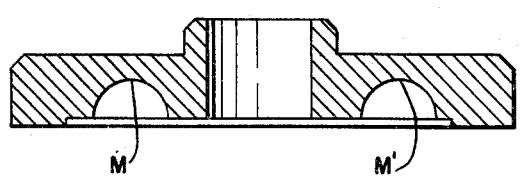
FIGURE 4 is a cross-sectional view taken substantially along the plane defined by the reference line 4—4 of FIGURE 3.

Channels of the type represented in FIGURES 3, 4 and 5, with two points of minimum depth $m$ and $m'$ and two of maximum depth M and M' are destined for cyclical evolutions, characteristic of internal combustion engines.

In this case, two adjacent blades, in symmetrical positions, on both sides of point $m$, enclose between them a minimum volume, then during the rotation of the shaft they reach symmetrical positions on both sides of the point M, including between them a maximum volume, corresponding to the admission phase of the cycle of piston-motors.

Continuing the rotation till point $m'$, the air or the fuel mixture is compressed. Then at a given moment, there occurs the ignition and between $m'$ and M' takes place the expansion phase of the cycle. Then follows from M' to $m$ the exhaustion phase and after that the cycle is recommenced, when the adjacent blades reach again symmetrical positions on both sides of the point $m$.

The driving torque, arising in the expansion phase, is determined by the difference of surfaces which adjacent blades present to the expansion gases, this difference being the consequence of the different positions, taken simultaneously by adjacent blades, in relation to a point of reference respectively to the admission or the exhaustion slit.

The technical and economical advantages of the mechanism of this invention in comparison with prior art mechanisms having radial gliding blades are as follows:

(a) Wear of the edge of a blade by centrifugal forces is reduced to less than a tenth, because during a complete rotation, the path of the blade is equal to twice the radius of the peak and not to the circumference of the cylinder in which the rotor is moving. Since wear of the blades peak is not influenced by the centrifugal force, but only by the tension of the spring pressing it in the channel, wear may be much reduced by a rational choice of the springs tension. Thus, in comparison with the prior art mechanism, there exist possibilities of utilizing higher speeds, or cheaper materials or for a prolongation of the device;

(b) The elastic mounting of the blades avoids the possibilities of grippings between the caps;

(c) There is no need for employing expensive construction materials;

(d) The mechanism is stable at very low rotary speeds;

(e) The mechanism is perfectly balanced;

(f) The volumetric efficiencies which may be realized by the mechanism of this invention is positively higher than those of the prior art mechanisms, since the tightening conditions are essentially improved by utilizing adequate profiles of the active elements (blades and channels);

(g) Theoretically the influence of the dead space upon the volumetric efficiency may be reduced in this invention and practically it won't surpass that of the most successful prior art volumetric mechanisms;

(h) Eliminates the need for valves;

(i) Permits efficient cooling of the stators-caps, of the rotor and of the blades, which is an essential advantage in the field of compressors and internal combustion engines, this advantage being not realized in an efficient way by any of the prior art volumetric mechanisms;

(j) The mechanical stresses to which the rotor may be submitted are much higher than in the prior art devices, since the whole rotor is encircled by a shrink-ring of dimensions chosen in such a way as to correspond to the stresses exerted on the mechanism;

(k) Reduced over-all size for performances similar to those with which it is compared;

(l) As an internal combustion engine, the mechanism of this invention is positively superior to the Wankel-motor since it presents much better tightening conditions and it also gives the possibility of an efficient cooling of the rotor.

I claim:

1. A rotary volumetric mechanism for driving a fluid or for being driven by a fluid, comprising, in combination:
    (a) a first solid member having means defining an annular channel in one surface thereof, the depth of said annular channel as measured from said one surface being continuously variable along the longitudinal dimension of said channel;
    (b) means defining a fluid inlet channel communicating with said annular channel at a first location;
    (c) means defining a fluid outlet channel communicating with said annular channel at a second location;
    (d) a second solid member positioned adjacent to said one surface of said first solid member and substantially closing said annular channel;
    (e) a plurality of protruding elements attached to said second solid member and projecting therefrom into said annular channel, each of said protruding elements being shaped to fit relatively snugly within said channel;
    (f) spring means urging each of said protruding elements toward said annular channel; and (g) said first and second solid members being mounted for rotation relative to each other so as to permit relative rotary motion between said protruding elements and said annular channel for continuously varying the annular channel volume enclosed between each adjacent pair of protruding elements.

2. The combination defined in claim 1 wherein said annular channel is semicircular in cross-sectional conconfiguration and wherein said protruding members are semicircular in cross-sectional configuration.

3. The combination defined in claim 1 wherein said annular channel has at least one point of minimum depth and at least one point of maximum depth.

4. The combination defined in claim 3 wherein said point of minimum depth and said point of maximum depth are diametrically opposed to each other.

5. The combination defined in claim 1 wherein said annular channel has two points of minimum depth and two points of maximum depth.

6. The combination defined in claim 5 wherein said points of minimum depth are diametrically opposed to each other, said points of maximum depth are diametrically opposed to each other, and said points of minimum depth are located on a line which is approximately perpendicular to the line between said points of maximum depth.

References Cited

UNITED STATES PATENTS

| | | | |
|---|---|---|---|
| 268,195 | 11/1882 | Davis | 91—126 |
| 628,960 | 7/1889 | Parker | 91—126 |
| 2,232,599 | 2/1941 | Fehn | 103—139 |
| 2,466,623 | 4/1949 | Tucker et al. | 103—139 |

C. J. HUSAR, Primary Examiner

U.S. Cl. X.R.

103—139; 230—152; 91—126

PO-1050
(5/69)

UNITED STATES PATENT OFFICE
CERTIFICATE OF CORRECTION

Patent No. 3,489,126          Dated January 13th, 1970

Inventor(s) Karl Nicolaus Regar

It is certified that error appears in the above-identified patent and that said Letters Patent are hereby corrected as shown below:

Column 1, line 5, change "Reger" to --Regar--; line 63, delete "rotative". Column 4, line 18, after "prolongation" insert --of the service-life--; line 32, after "reduced" inser --to zero--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents